(12) United States Patent
Shimura et al.

(10) Patent No.: US 9,525,373 B2
(45) Date of Patent: Dec. 20, 2016

(54) STEPPING MOTOR AND MOTORIZED VALVE USING IT

(71) Applicant: FUJIKOKI CORPORATION, Tokyo (JP)

(72) Inventors: Tomonori Shimura, Tokyo (JP); Tomoari Ohuchi, Tokyo (JP)

(73) Assignee: FUJIKOKI CORPORATION (JP)

( * ) Notice: Subject to any disclaimer, the term of this patent is extended or adjusted under 35 U.S.C. 154(b) by 194 days.

(21) Appl. No.: 14/167,021

(22) Filed: Jan. 29, 2014

(65) Prior Publication Data

US 2014/0231684 A1    Aug. 21, 2014

(30) Foreign Application Priority Data

Feb. 19, 2013  (JP) ................. 2013-030369

(51) Int. Cl.
| | |
|---|---|
| *F16K 31/02* | (2006.01) |
| *H02P 8/38* | (2006.01) |
| *F16K 31/04* | (2006.01) |
| *H02P 8/24* | (2006.01) |
| *H02P 8/32* | (2006.01) |
| *F16K 37/00* | (2006.01) |
| *H02K 37/00* | (2006.01) |

(52) U.S. Cl.
CPC ................ *H02P 8/38* (2013.01); *F16K 31/04* (2013.01); *F16K 37/0041* (2013.01); *H02K 11/225* (2016.01); *H02P 8/24* (2013.01); *H02P 8/32* (2013.01); *H02K 37/00* (2013.01)

(58) Field of Classification Search
CPC ....... F16K 31/04; F16K 31/043; F16K 31/047
See application file for complete search history.

(56) References Cited

U.S. PATENT DOCUMENTS

| | | | | |
|---|---|---|---|---|
| 777,373 | A * | 12/1904 | Howard | .............. F16K 31/0655 |
| | | | | 251/77 |
| 4,463,930 | A * | 8/1984 | Vamvakas | ............. F16K 31/048 |
| | | | | 251/129.12 |
| 6,641,111 | B2 * | 11/2003 | Lorenz | ..................... F02D 9/10 |
| | | | | 251/77 |

* cited by examiner

*Primary Examiner* — Eric Keasel
(74) *Attorney, Agent, or Firm* — Bacon & Thomas, PLLC (57) ABSTRACT

To provide a stepping motor which can precisely and reliably detect stopping of a rotor with respect to a stopper with a simple structure, i.e., positioning of a base point of the rotor, and provide a motorized valve using it.
The stepping motor includes a stator 55 and a rotor 57 rotationally driven by the stator 55, and a detection rotor 47 detecting a rotation position of the rotor 57. The detection rotor 47 is rotatably disposed on a co-axial center L with the rotor 57 and rotationally driven via a rotation drive mechanism between the rotor 57 and the detection rotor 47. The rotation drive mechanism has a drive play having a predetermined length or angle in the rotation direction.

7 Claims, 8 Drawing Sheets

STEPPING MOTOR AND MOTORIZED VALVE USING IT

BACKGROUND OF THE INVENTION

Field of the Invention

The present invention relates to a stepping motor and a motorized valve using it.

Description of the Conventional Art

Conventionally, in a motorized valve using a stepping motor, for example, reliable base point positioning of the stepping motor (it is also called initializing) is guaranteed by inputting a drive pulse signal which is over the maximum step numbers necessary to close the motorized valve. For example, Japanese Patent Application Laid-Open No. 2005-287152 discloses a solenoid coil device of a stepping motor of such a motorized valve. In this conventional technique, exciting coils, in which a pair of magnetic pole plate (magnetic pole teeth) is provided from the top and bottom inside thereof, are provided in the two-tiered up and down.

On the other hand, it has been known that some problems generate when continuing to input the drive pulse signal to a stepping motor after a rotor constituting the stepping motor is stopped by a stopper, or the like, at a base point position. These problems are generating of noise or vibration, and lowering of durability of the stepping motor.

For solving these problems, Japanese Patent No. 4,028,291 discloses a technique detecting contact of a rotor to a stopper at a time of the base point positioning of the stepping motor, and stopping the base positioning pulse energizing the drive coil.

In the drive device of the motorized valve disclosed in Japanese Patent No. 4,028,291, at a time of base point positioning of the motorized valve, the device outputs base point positioning pulse to the drive coil of a stator so as to return the rotor of the stepping motor to the base point position. At the same time, the device inputs a magnetic detection signal from a magnetic detection means. Then, the device recognizes a changing pattern of the magnetic detection signal corresponding to the difference of timing between when the stopper contacts and when the magnetic detection signal transfers from high level to low level or low level to high level. Then, the device detects the contact of the rotor to the stopper in the step corresponding to the changing pattern, and stops the pulse output for base point positioning.

SUMMARY OF THE INVENTION

Problems to be Solved by the Invention

On the other hand, as described above, after a rotor contacts a stopper at the base point position and stops, when the device continues to input the drive pulse signal, the rotor is attracted to an opposed phase (magnetic pole) at a certain step and reverses. Further, when the device continues to input the drive pulse signal more, the rotor reverses again and contacts the stopper again.

Figure 8:
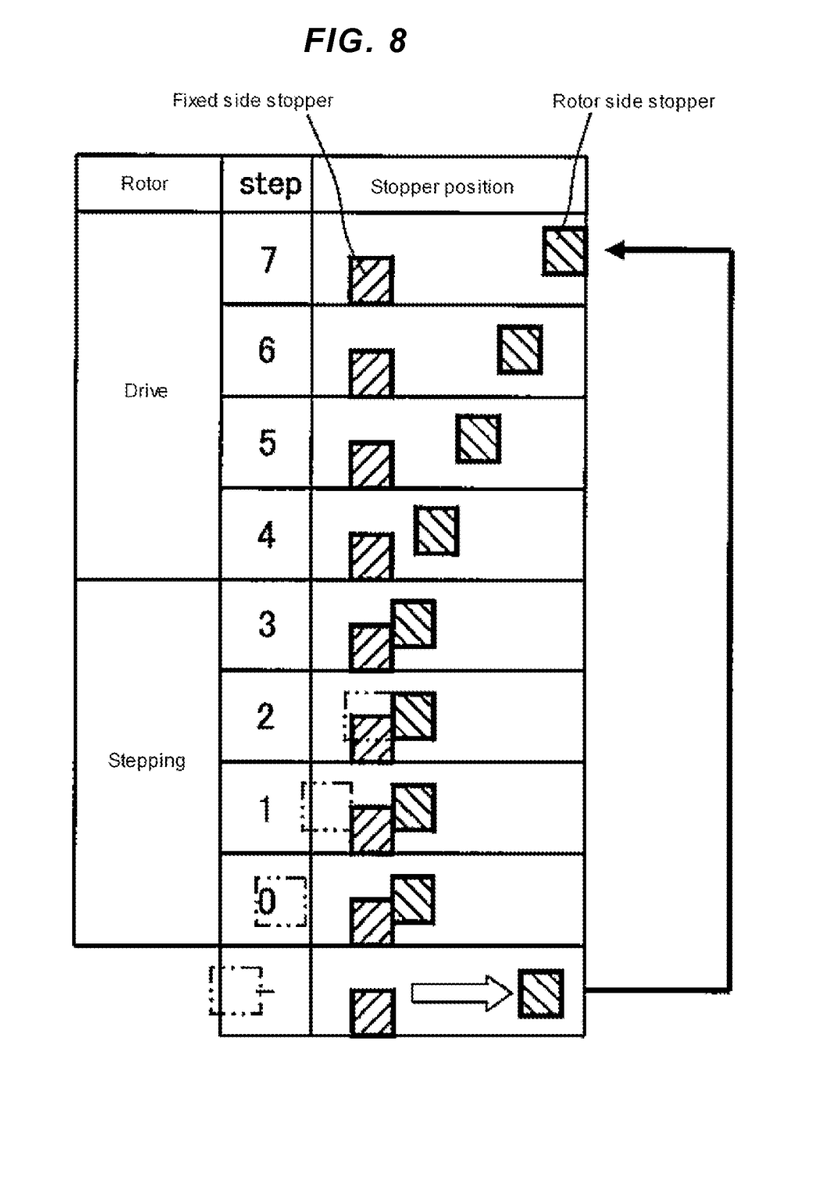
FIG. 8 is a view schematically explaining a rotor drive of the conventional stepping motor.

For example, a case that the magnetic pole pattern of the coil is repeated for each 8 steps by a predetermined excitation order to the stator coil, is described. As illustrated in FIG. 8, in step 7 to step 4, the rotor rotationally drives at a predetermined angle for each input of the drive pulse signal, and the stopper on the rotor side approaches the stopper on the fixed side provided on the base point position of the rotor. Then, in step 3, the stopper on the rotor side contacts the stopper on the fixed side and the rotor stops at the base point position. Then, from step 2 to step 0, even when the drive pulse signal is input, the rotation drive is blocked, so that the rotor continues to stop (stepping) at the base point position. In addition, in FIG. 8, the mark drew by an imaginary line (two-dot chain line) indicates how the stopper on the rotor side continues to rotate when it is assumed that the stopper on the fixed side is not present.

However, when the excitation to the stator coil is transferred from step 0 to step 7, the rotor is attracted to an opposed phase (magnetic pole) and reverses, so that the stopper on the rotor side leaves from the stopper on the fixed side (8 step reversion). That is, the stopper on the rotor side, which contacts the stopper on the fixed side in step 2 to step 0, is attracted to the position indicated by the two-dot chain line. However, when the stopper on the rotor side transfers from the step 0 to step 7 again, the stopper on the rotor side is attracted to the following phase and the rotor reverses.

In the drive device disclosed in U.S. Pat. No. 4,028,291, the operations of the above contacting/reversing is digitized by using a Hall IC of an alternating type, or the like, and compared with a normal drive waveform, so that the stopping of the rotor is detected.

However, the above contacting/reversing operation is a periodic movement and there is a possibility that the drive waveform according to the contacting/reversing operation and the normal drive waveform are synchronized depending on the detection position. That is, there is a possibility that the drive waveform according to the contacting/reversing operation and the waveform of the normal drive are not changed so much. Thus, in the above method detecting the base point position of the rotor by using the contacting/reversing operation, a problem, in which the stopping of the rotor by contacting to the stopper cannot be reliably detected, may occur.

The present invention is made in view of the above problem and directed to provide a stepping motor which can precisely and reliably detect stopping of a rotor to a stopper with a simple structure, i.e., positioning of a base point. The present invention is also directed to provide a motorized valve using it.

Means to Solve the Problems

For solving the above problem, a stepping motor according to the present invention includes a stator, a rotor rotationally driven by the stator. The stepping motor further includes a detection rotor for detecting a rotation position of the rotor. The detection rotor is rotatably disposed on a co-axial center with the rotor and rotationally driven through a rotation drive mechanism between the rotor and the detection rotor. The rotation drive mechanism has a drive play having a predetermined length or angle in the rotation direction.

In a preferable embodiment, the stepping motor has a rotation stop mechanism for stopping the rotation of the rotor. The length or angle of the drive play of the rotation drive mechanism is equal to or greater than a reversion length or a reversion angle of the rotor when the rotation of the rotor is blocked by the rotation stop mechanism.

Further, in a preferable embodiment, the rotation drive mechanism includes a plurality of projections of the rotor disposed having a predetermined length interval or angle interval in a rotation direction, and another projection of the detection rotor disposed between a plurality of projections of the rotor.

Further, in a preferable embodiment, the rotation drive mechanism includes a drive play concave portion of the rotor having a predetermined length interval or angle interval in a rotation direction, and projections of the detection rotor loosely fitted in the drive play concave portion of the rotor.

Furthermore, in a preferable embodiment, urging force inhibiting rotation of the detection rotor is applied to the detection rotor and preferably, the urging force is generated by a magnetic material provided on an outside of the detection rotor.

Further, the motorized valve according to the present invention includes the above stepping motor, a valve main body, a valve body, and a conversion mechanism. The valve main body has a valve chamber and a valve port opening to the valve chamber. The valve body is for opening/closing the valve port and disposed movably up and down in the valve chamber. The conversion mechanism converses the rotation movement of the rotor to the up and down movement of the valve body. The stepping motor rotationally drives the rotor by the stator, moves the valve body up and down by the conversion mechanism, and stops the rotation of the rotor by a rotation stop mechanism when the valve body reaches at a predetermined position.

In a preferable embodiment, the predetermined position is a position in which the valve body closes the valve port or a position in which the valve body fully open the valve port.

Further, in a preferable embodiment, a can is fixed to the valve main body, and the rotor and the detection rotor is disposed in the can.

Effect of the Invention

According to the stepping motor and the motorized valve using it, the detection rotor detecting a rotation position of the rotor is rotatably disposed on a co-axial center with a rotation axis of the rotor, and rotationally driven by the rotor. A rotational drive mechanism between the rotor and the detection rotor has a drive play of a predetermined length or angle in the rotation direction. Thus, when the rotor reverses, the length or angle of the drive play inhibits the transmission of rotation drive force from the rotor to the detection rotor, so that even when the rotor contacts a stopper and vibrates, the vibration is not transmitted to the detection rotor. Therefore, by detecting signals based on the detection rotor, it can be reliably detected that, for example, the valve body reaches to a predetermined position, so that positioning of the base point of the rotor can be precisely performed. Further, the length or angle of the drive play in the rotation drive mechanism is equal to or greater than a reversion length or a reversion angle of the rotor. Thus, the transmission of the rotation drive force from the rotor to the detection rotor is reliably inhibited more, so that the positioning of the base point of the rotor can be more precisely performed. Furthermore, since urging force inhibiting the rotation of the detection rotor is applied to the detection rotor, the signal based on the detection rotor at a time of reversion of the rotor becomes stable. Thus, the detection of the contacting state of the rotor to the stopper can be preciously performed more.

DETAILED DESCRIPTION OF PREFERRED EMBODIMENT

The exemplary embodiment of the stepping motor according to the present invention and the motorized valve using the stepping motor will be described, referring to drawings as follows.

Figure 1:
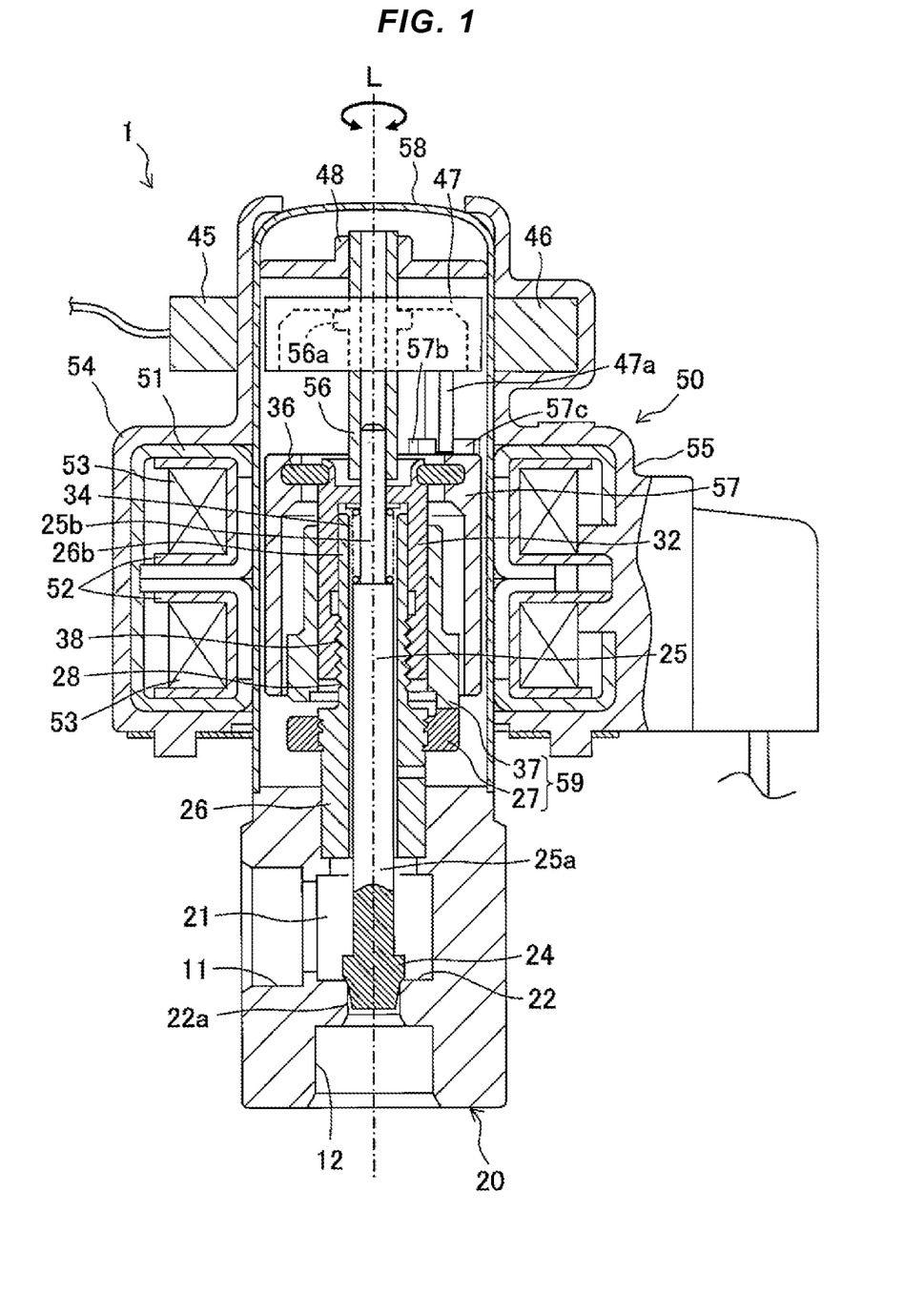
FIG. 1 is vertical cross-sectional view illustrating a basic constitution of an exemplary embodiment of a motorized valve according to the present invention.
Figure 2:
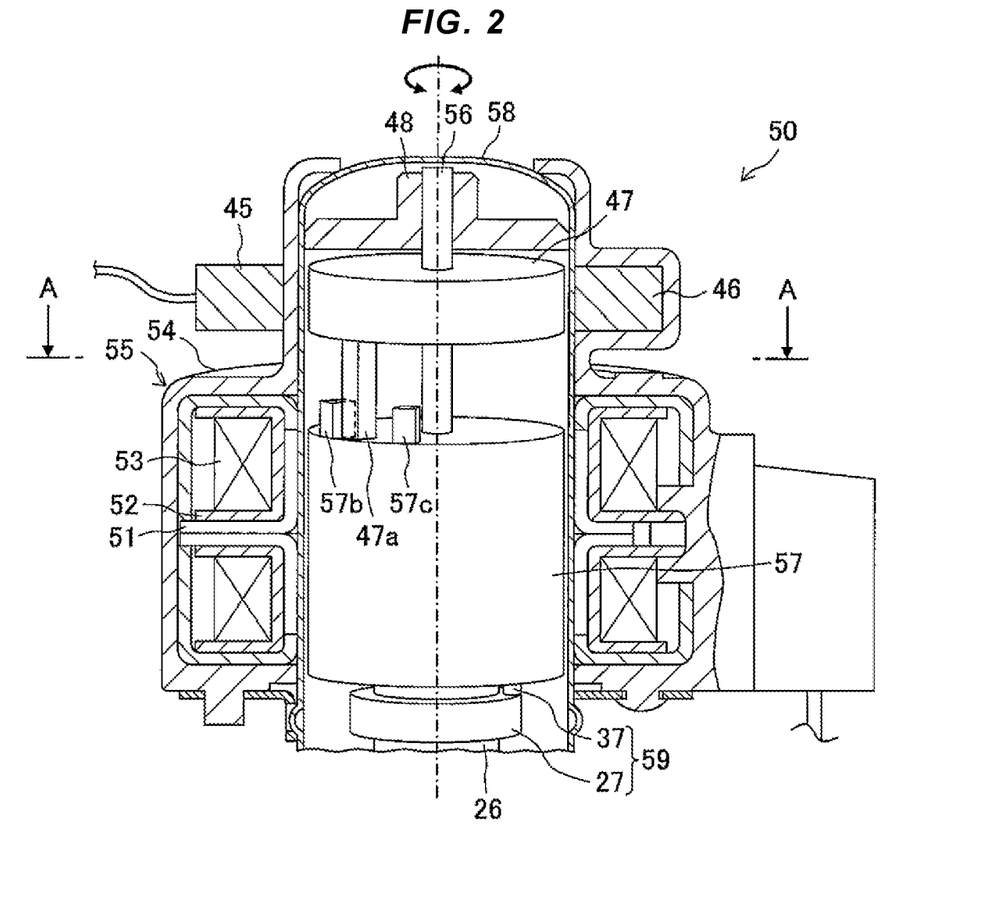
FIG. 2 is a schematic view schematically illustrating the basic constitution of the stepping motor adapted to the motorized valve illustrated in FIG. 1.
Figure 3:
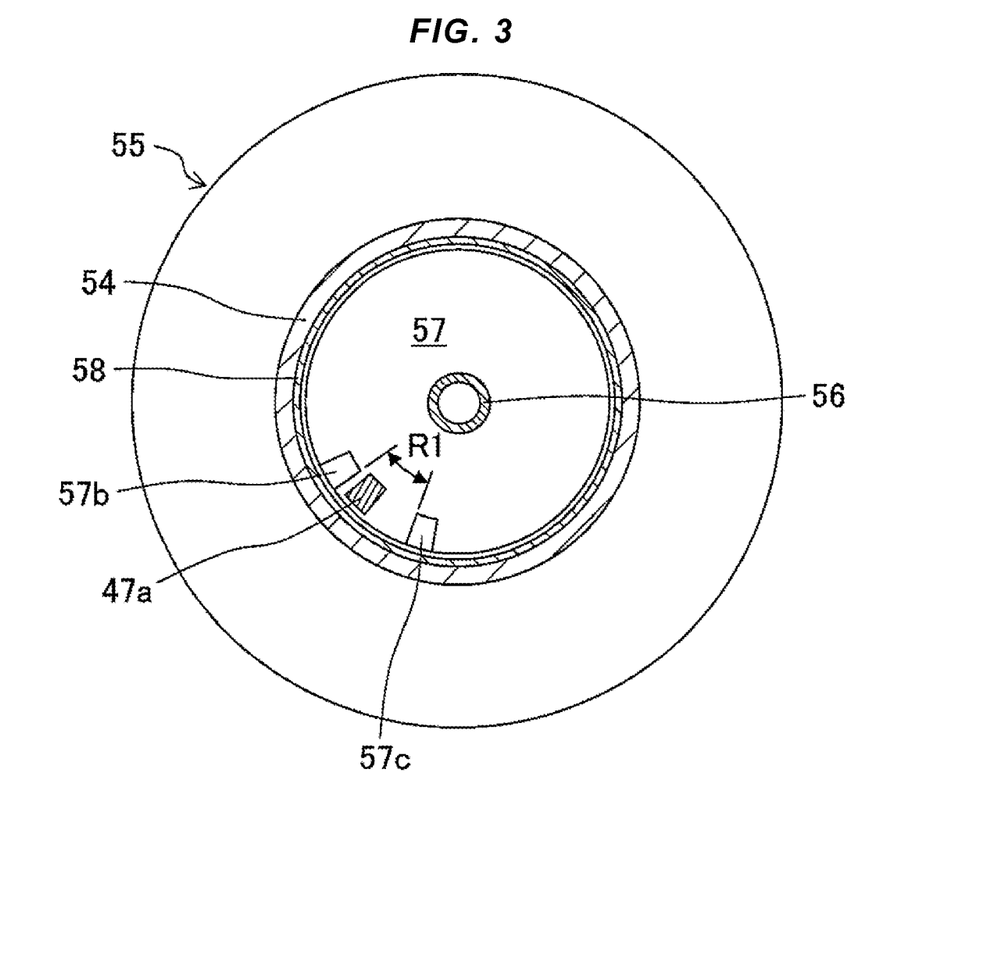
FIG. 3 is a cross-sectional view along a line A-A illustrated in FIG. 2.

FIG. 1 is a basic constitution of the exemplary embodiment of the motorized valve according to the present invention. In this figure, the motorized valve is a state of closing. The motorized valve 1 illustrated in FIG. 1 is used in, for example, a heat pumping type heating and cooling system, or the like. Further, FIG. 2 is a schematic view illustrating the basic constitution of the stepping motor adapted in the motorized valve illustrated in FIG. 1. FIG. 3 is a cross-sectional view along a line A-A illustrated in FIG. 2.

The motorized valve 1 illustrated in FIG. 1 mainly includes a valve chamber 21, a valve main body 20, a rod-shaped valve body 25, and a stepping motor 50. The valve main body 20 has a valve port 22a opening to the valve chamber 21. The rod-shaped valve body 25 is disposed movably up and down in the valve chamber 21 for opening/closing the valve port 22a. The stepping motor 50 moves the valve body 25 up and down.

In the valve chamber 21 in the valve main body 20, the valve port 22a having a valve seat 22 opening to the valve chamber 21 is formed at a lower portion of the valve chamber 21. A first inlet and outlet port 11 is opened on the side portion of the valve chamber 21. A second inlet and outlet port 12 communicating to the valve port 22a is opened at a lower portion of the valve port 22a.

At an upper opening of the valve main body 20, a lower end of a cylindrical can 58 having a ceiling portion is fixed. A lower end portion of a cylindrical guide bush 26 is press-fitted to an upper inner periphery portion of the valve main body 20 and the valve body 25 is slidably inserting-fitted inside the guide bush 26. A male screw 28 is formed on an outer periphery of an upper reduced diameter portion 26b of the guide bush 26. A cylindrical valve body holder 32 is outer-fitted on a periphery of the male screw 28. A female screw 38 is formed on an inner periphery of the valve body holder 32. The male screw 28 of the guide bush 26 and the female screw 38 of the valve body holder 32 are screwed.

Further, an upper reduced diameter portion 25b of the valve body 25 is fixed to a cylindrical rotation axis (a supporting axis) 56 by press-fitting, or the like, in a state of sildably inserting in an upper portion (a ceiling portion) of the valve body holder 32. Further, a pressing coil spring 34 is disposed at an outer periphery of the upper reduced diameter portion 25b of the valve body 25, and between the ceiling portion of the valve body holder 32 and a step portion, which is between a lower large diameter portion 25a and the upper reduced diameter portion 25b of the valve body 25. This coil spring 34 urges the valve body 25 downward (in the direction of valve closing).

On the other hand, a stepping motor 50 includes a yoke 51, a bobbin 52, a stator coil 53, and a resin mold cover 54, or the like. The stepping motor 50 has a stator 55 externally-fixed to a can 58, and a rotor 57 disposed rotatably with respect to the can 58 inside the can 58. The rotor 57 is formed, for example, by mixing a magnetic material and a resin, and is consisted of a magnet magnetized by N pole and S pole having a predetermined interval. A supporting ring 36 is integrally fixed on an upper end portion of the rotor 57. An upper projection of the valve body holder 32 is caulking-fixed to the supporting ring 36. Therefore, the rotor 57, supporting ring 36, and the valve body holder 32 are integrally connected, and slidably supported by the valve body 25 fixed with a rotation axis 56 via the coil spring 34. Thus, the valve body 25 also moves up and down when the rotor 57 rotates and moves up and down.

Further, on the upper side of the rotor 57 and the inside the can 58, a detection rotor 47 is disposed. The detection rotor 47 is placed on a projecting support portion 56a formed on the rotation axis 56 of the rotor 57, disposed relatively rotatably with respect to the rotation axis 56 of the rotor 57, and co-axially to a rotation axial center L of the rotor 57. The rotation drive force of the rotor 57 rotationally drives the detection rotor 47. The detection rotor 47 has a same or a different diameter with a diameter of the rotor 57, and is magnetized with a same pattern of the rotor 57 (a pattern in which the angle interval of N pole and S pole is the same as the pattern of the rotor 57). The detection rotor 47 and the rotor 57 are disposed, separating having a distance in which each magnetic force does not affect each other. In addition, angle intervals of N pole and S pole of the magnetized pattern formed on outer periphery of the detection rotor 47 can be different with angle intervals of the rotor 57.

On an upper surface of the rotor 57, two projections 57b and 57c are disposed, having a predetermined length interval (or angle interval) R1 in the rotation direction of the rotor 57. On a lower surface of the detection rotor 47, a rod-shaped projection 47a is disposed, having a constitution in which the top end of the projection 47a is disposed between the projections 57b and 57c (refer to FIG. 2). Having such a constitution, in which the top end of the rod-shaped projection 47a is disposed between the two projections 57b and 57c of the rotor 47, the detection rotor 47 is relatively slidable with respect to the rotor 57 inside the predetermined length interval (or angle interval) R1 (that is, in a range of R1), (refer to FIG. 3). As described above, referring to FIG. 8, the interval R1 is set so as to be equal to or greater than a length (reversion length) or an angle (reversion angle), in which the rotor 57 is reversed by the following phase (magnetic pole) after a rotor side stopper contacts a fixed side stopper.

In addition, a top end of the rotation axis 56 is supported by being inserted through a hole formed at a center portion of a support member 48. The support member 48 is disposed, inscribing in the can 58.

Further, a magnetic material 46 is disposed outside the detection rotor 47. The urging force (it is also called as detent torque) inhibiting the rotation of the detection rotor 47 is applied by a magnetic field, which is formed on the periphery of the detection rotor 47 by the magnetic material 46. Furthermore, at the outside of the detection rotor 47, a Hall IC 45 detecting change of the magnetism by the detection rotor 47 is disposed. The rotation position of the rotor 57 is detected based on an output signal detected by the Hall IC 45.

Further, a stopper (fixed side stopper) 27 is fixed on the outside of the guide bush 26 and a stopper 37 is fixed on the outside of the valve body holder 32. When the valve body 25 reaches a predetermined position, for example, when the rotor 57 rotationally lowers to a position in which a valve body portion 24, which is a lower end of the valve body 25, closes the valve port 22a, the stopper 37 stops the rotor 57 to rotate more. That is, in the present exemplary embodiment, a rotation stop mechanism 59 to stop the rotation of the rotor 57 is constituted by the stopper 27 of the guide bush 26 and the stopper 37 of the valve body holder 32.

In the above motorized valve 1, when the drive pulse signal is supplied to the stator 55 in a first embodiment (drive embodiment in closing valve direction), the rotor 57, the valve body holder 32, the rotational axis 56, and the like, rotate in one direction (for example, in FIG. 1, the clockwise rotation viewing from the upper side). According to this action, the valve body holder 32 is lowered by screw-feeding the male screw 28 of the guide bush 26 and the female screw 38 of the valve body holder 32. Then, the valve body portion 24 of the valve body 25 is pushed to the valve port 22a via the press-coil spring 34, so that the valve port 22a is closed. A conversion mechanism to convert the rotation movement of the rotor 57 of the stepping motor 50 to the up and down movement of the valve body 25 is constituted with the male screw 28 of the guide bush 26 and the female screw 38 of the valve body holder 32. At this time, the projection 47a on the lower surface of the detection rotor 47 contacts the projection 57c on the upper surface of the rotor 57 and the drive force is transmitted from the rotor 57 to the detection rotor 47 via the projection 57c and the projection 47a. Then, the detection rotor 47 follows the rotor 57 and rotates in one direction. In addition, the detection rotor 47 lowers according to the rotation of the rotor 57, maintaining the interval between the detection rotor 47 and the rotor 57 to be substantially constant.

When the valve port 22a is closed, the stopper 37 of the valve holder 32 impinges the stopper 27 of the guide bush 26. Even when the drive pulse signal is supplied to the stator 55, the lowering of the valve holder 32 is forcibly prevented and the rotation of the rotor 57 and the detection rotor 47 are stopped in a state that the projection 47a of the detection rotor 47 contacts projection 57c of the rotor 57.

Further, when the drive pulse signal is supplied more to the stator 55, the rotor 57 is attracted to an opposed phase (magnetic pole) in a certain step and reverses. For example, the stopper 27 of the guide bush 26 separates from the stopper 37 of the valve holder 32. On the other hand, the detection rotor 47 is relatively rotatable with respect to the rotor 57. The interval R 1 between the projection 57b and the projection 57c of the rotor 57 in the rotation direction is set, in its inside, to have a length (or angle), in which the rod-shaped projection 47a of the detection rotor 47 can rotate equal to or greater than the reversion length (or reversion angle) of the rotor 57 (refer to FIG. 3). Therefore, even when the rotor 57 is attracted to the opposed phase and reverses, the projection 47a of the detection rotor 47 does not contact the projection 57b and the drive force is not transmitted from the rotor 57 to the detection rotor 47, so that the detection rotor 47 urged by the magnetic material 46 does not rotate. That is, the detection rotor 47 once stopped at a position, in which the valve body 25 closes the valve port 22a, continues to stop at the position even when the rotor 57 reverses. The magnetism generated in the detection rotor 47 is detected by using the Hall IC 45 and thereby, it can be reliably detected that the lowering of the valve body 25 stops and the valve port 22a is closed (the positioning of the base point of the rotor 57).

Further, then, when energization to the stator 55 is made to stop, the vibration and the noise by contacting the stopper 27 of the guide bush 26 to the stopper 37 of the valve body holder 32 is can be inhibited.

Furthermore, since the magnetic material 46 is disposed outside the detection rotor 47, by the effect of the magnetism between the detection rotor 47 and the magnetic material 46, the detection rotor 47 continues to stop at the position even when the rotor reverses.

In addition, the operation from the closing valve state of the valve port 22a to the opening valve state of the valve port 22a, i.e., in the second embodiment (the drive embodiment in the opening the valve embodiment) will be described as follows. When the drive pulse signal is supplied, and the rotor 57, the valve body holder 32, and the rotation axis 56, or the like, are rotated in another direction to the guide bush 26 fixed with respect to the valve main body 20 (for example, in FIG. 1, in anti-clockwise direction viewing from the upper side), the valve body holder 32 rises by screw-feeding the male screw 28 of the guide bush 26 and the female screw 38 of the valve body holder 32. The valve body portion 24 of the valve body 25 separates from the valve port 22a, so that the valve port 22a is opened and, for example, a refrigerant passes through the valve port 22a. At this time, after the detection rotor 47 continues to stop only a partial step, the projection 47a on the lower surface of the detection rotor 47 contacts the projection 57b on the upper surface of the rotor 57. Then, the drive force is transmitted from the rotor 57 to the detector rotor 47 via the projection 57b and the projection 47a, so that the detection rotor 47 follows the rotor 57 and rotates in another direction.

Then, referring to FIG. 4, when the rotor 57, or the like, rotates in one direction (for example, clockwise direction viewing from the upper side in FIG. 1), the drive of the detection rotor 47 and the rotor 57 will be described in more detail. For example, similarly as the case in FIG. 8, the case that the patterns of the magnetic pole of a stator coil are repeated for each 8 step by a predetermined excitation order to the stator coil, will be described. At first, in step 7 illustrated in the upper side in FIG. 4, the rotor 57 rotates in one direction based on the drive pulse signal in the stator 55, so that the projection 57c provided on the upper surface of the rotor 57 contacts the projection 47a provided on the lower surface of the detection rotor 47.

Then, in step 7 to step 4, when the drive pulse signal is input, the drive force is transmitted from the rotor 57 to the detection rotor 47 via the projection 57c and the projection 47a. The detection rotor 47 rotationally drives with rotor 57 against the urging force by the magnetic material 46. By this rotation drive, the stopper 37 of the valve body holder 32 (stopper on the rotor 57 side) approaches the stopper 27 of the guide bush 26 (stopper on the fixed side). Then, the projection 57c of the rotor 57 and the projection 47a of the detection rotor 47 approach the position corresponding to the base point position of the rotor 57. In step 3, when the drive pulse signal is input, the stopper 37 of the valve body holder 32 (stopper on the rotor 57 side) contacts the stopper 27 of the guide bush 26 (stopper on the fixed side). Then, the rotor 57 stops at the base point position in a state that the projection 57c of the rotor 57 contacts the projection 47a of the detection rotor 47. Then, in step 2 to step 0, even when the drive pulse signal is input, the rotations of the rotor 57 and the detection rotor 47 are inhibited, so that the rotor 57 continues to stop at the base point position (stepping).

Figure 4:
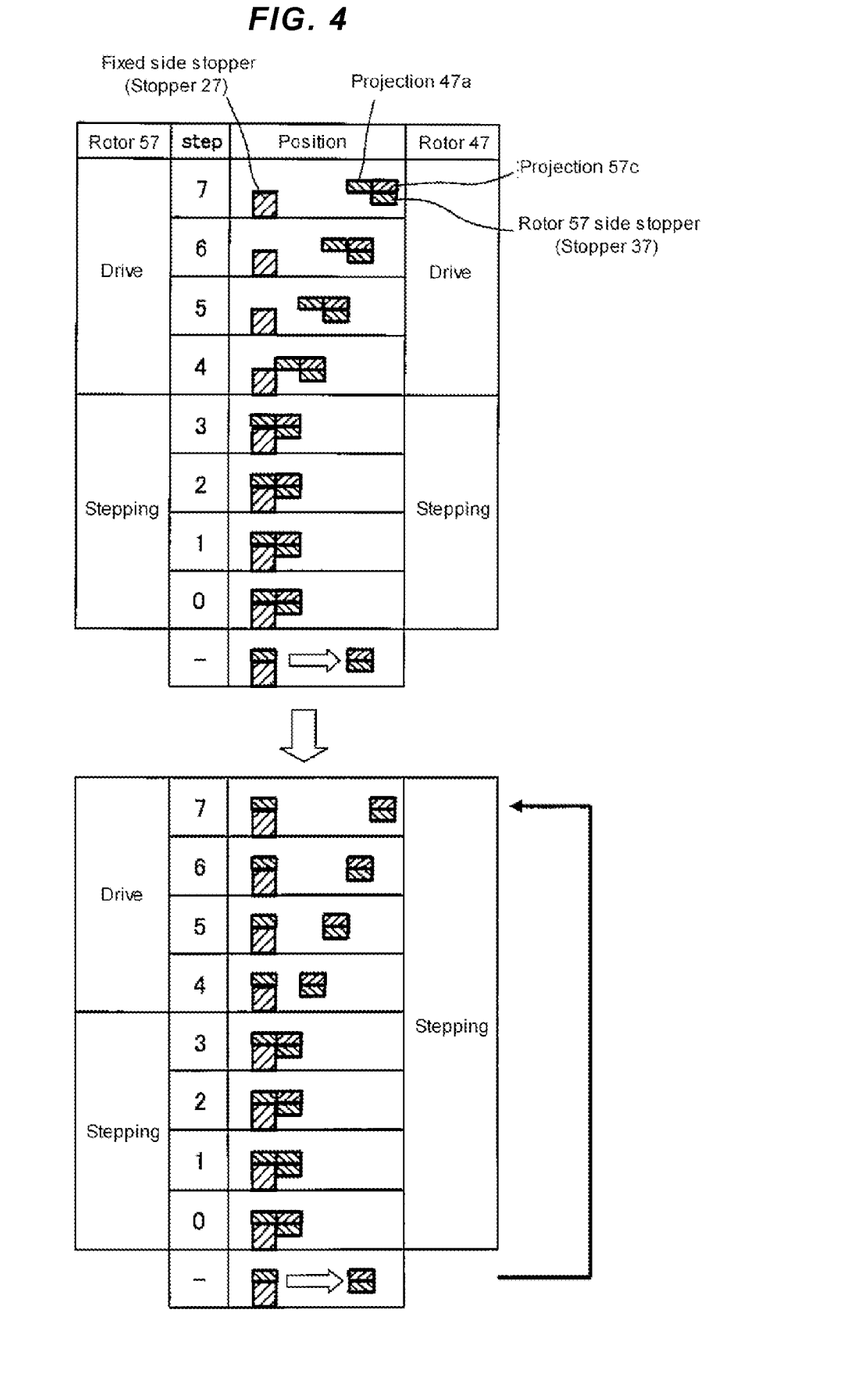
FIG. 4 is a view schematically illustrating a drive of the rotor of the stepping motor illustrated in FIG. 2.

Next, when the drive pulse signal is input after transferring from step 0 to step 7, as illustrated in lower side view in FIG. 4, the rotor 57 is attracted to the opposed phase (magnetic pole) and reverses. As the result of this, the stopper 37 of the valve body holder 32 (stopper on the rotor 57 side) separates from the stopper 27 of the guide bush 26 (stopper on the fixed side). On the other hand, the detection rotor 47 is relatively rotatable to the rotor 57. The interval R1 between the projection 57b and the projection 57c of the rotor 57 in the rotation direction, is set, in its inside, so as to have the position that the rod-shaped projection 47a of the detection rotor 47 can rotate equal to or greater than the reversion length (reversion angle) of the rotor 57. Therefore, even when the rotor 57 is attracted to the opposed phase and reverses, the drive force is not transmitted from the rotor 57 to the detection rotor 47 and the detection rotor 47 continues to stop at the base point position of the rotor 57. The detection rotor 47, which once stops at the base point position of the rotor 57, continues to stop at the base point position of the rotor 57 even when the contacting/reversing action generates repeatedly. By detecting the magnetism generated in the detection rotor 47 using the Hall IC 45, it can be reliably detected that the rotor 57 reaches at the predetermined base point position even when the rotor reverses (performing the base point positioning of the rotor 57).

Figure 5:
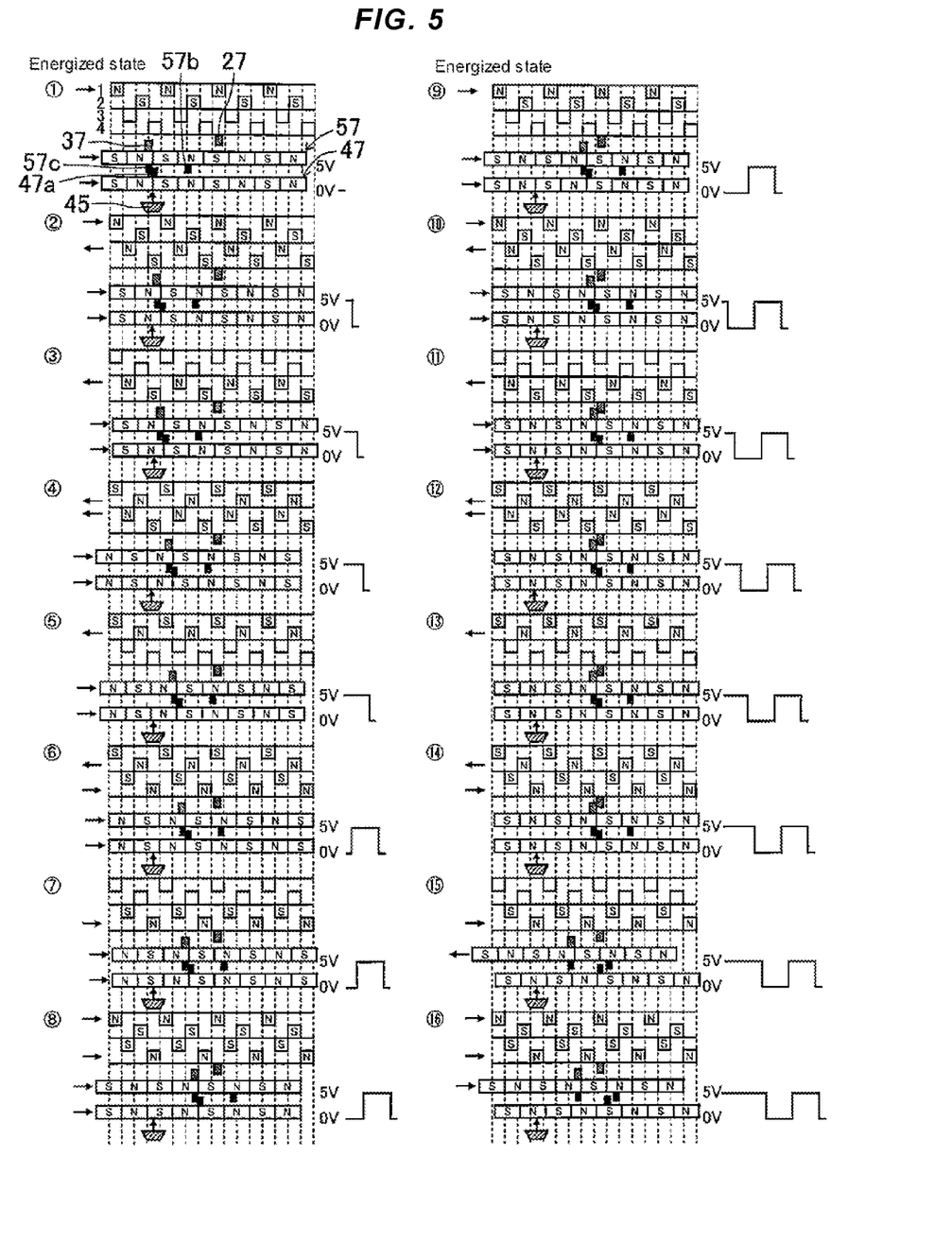
FIG. 5 is a view explaining the drive of the rotor of the stepping motor illustrated in FIG. 2 and output signals of Hall IC.

Referring to FIG. 5, the drive of the detection rotor 47 and the rotor 57 of the stepping motor 50 and the output signal of the Hall IC 45, when the rotor 57, or the like, rotates in one direction (for example, in FIG. 1, clockwise rotation viewing from the upper side), will be described in detail more. The stepping motor 50 includes a stator in which a coil is provided in two tiered up and down. The coil has a pair of magnetic pole teeth from up and down inside thereof. The stepping motor 50 is the similar one disclosed in Japanese Patent Application Laid-Open No. 2005-287152.

At first, the rotor 57 rotates in one direction based on the drive pulse signal of the stator 55, so that the projection 57c provided on the upper surface of the rotor 57 contacts the projection 47a provided on the lower surface of the detection rotor 47 (① in FIG. 5). When N pole and S pole in the stator 55 are replaced sequentially in a state that the projection 57c of the rotor 57 contacts the projection 47a of the detection rotor 47, the drive force is transmitted from the rotor 57 to the detection rotor 47. Via 57c and 47a, the rotor 57 made of magnet rotationally moves and the detection rotor 47 rotates with the rotor 57. The output signal of a rectangular wave form changing, for example, 0 V to 5 V, 5 V to 0 V, or 0 V to 5 V is detected by the Hall IC 45 (① to ⑩ in FIG. 5).

In the next step, the stopper 37 of the valve body holder 32 (stopper on the rotor 57 side) contacts the stopper 27 of the guide bush 26 (stopper on the fixed side) and the rotations of the rotor 57 and the detection rotor 47 are inhibited in the state that the projection 57c of the rotor 57 contacts the projection 47a of the detection rotor 47 (corresponding to ⑪ in FIG. 5, and step 3 in FIG. 4). Even when N pole and S pole of the stator 55 are replaced sequentially in a state that the stopper 37 of the valve body holder 32 (stopper on the rotor 57 side) contacts the stopper 27 of the guide bush 26 (stopper on the fixed side), the rotor 57 and the detection rotor 47 do not rotate and continue to stop at the base point position of the rotor 57. The Hall IC 45 detects a constant voltage, for example, 5 V in this condition (corresponding to ⑫ to ⑭ in FIG. 5, and step 2 to step 0 in FIG. 4).

In the next step, N pole and S pole of the rotor 57 are attracted to N pole and S pole of the opposed phase of the stator 55 (the magnetic pole), and the rotor 57 reverses one direction to the opposed direction (another direction) by only a reversion length of 4 steps. The detection rotor 47 is relatively rotatable with respect to the rotor 57 and the interval R1 between the projection 57b and the projection 57c of the rotor 57 is set to have interval in which the rotor 57 can idle equal to or greater than the reversion length (or the reversion angle). Therefore, even when the rotor 57 is attracted to the opposed phase and reveres by the reversion length (or the reversion angle), the projection 47a of the detection rotor 47 does not contact the projection 57c and the projection 57b of the rotor 57 and the detection rotor 47 does not reverse, following the reversion of the rotor 57. The detection rotor continues to stop at the base point position of the rotor 57 and the Hall IC 45 detects a constant voltage, for example, 5 V at this condition (corresponding to ⑮ in FIG. 5 and step 7 in FIG. 4).

Then, even when N pole and S pole of the stator 55 are replaced and the rotor 57 rotates, the projection 47a of the detection rotor 47 is disposed between the projection 57b and the projection 57c of the rotor 57, so that the detection rotor 47 continues to stop at the base point position of the rotor 57. At this time, since the urging force to inhibit the rotation of the detection rotor 47 is applied by the magnetic field formed at the periphery of the detection rotor 47 by the magnetic material 46, the Hall IC 45 detects a constant voltage, for example, 5 V (corresponding to ⑯ in FIG. 5, and step 6 in FIG. 4). By detecting the constant voltage of the Hall IC 45, it can be reliably detected that the rotor 57 reaches the predetermined base point position (performing the positioning of the base point position of the rotor 57).

In addition, when the rotor 57 rotates to another direction (for example, in FIG. 1, anti-clockwise direction), the detection rotor 47 continues to stop by a certain step, i.e., the detection rotor 47 continues to stop, having a predetermined drive play. At a certain step, the projection 57b provided on the upper surface of the rotor 57 contacts the projection 47a provided on the lower surface of the detection rotor 47. Then, the drive force is transmitted from the rotor 57 to the detection rotor 47 via the projection 57b and the projection 47a, so that the detection rotor 47 rotates with the rotor 57. The Hall IC 45 provided outside of the detection rotor 47 detects the output signal having a rectangular wave.

As described above, in the present exemplary embodiment, a rotational drive mechanism transmitting rotationally drive force from the rotor 57 to the detection rotor 47 is constituted by two projections 57b and 57c provided on the upper surface of the rotor 57 and the rod-shaped projection 47a provided on the lower surface of the detection rotor 47. The rotation drive mechanism has a drive play having a predetermined length or angle in the rotation direction of the rotor 47. In particular, the drive play has a length or an angle equal to or greater than the reversion length or reversion angle of the rotor 57. Having this constitution, when the rotor 57 reverses, the transmission of the rotationally drive force from the rotor 57 to the detection rotor 47 is suppressed by the length or the angle of the drive play. Thus, it can be reliably detected that the valve body 25 closes the valve port 22a, (precisely performing the positioning of the base point of the rotor 57). Thus, it can be inhibited to generate continuous noises and vibration of the motorized valve and lower the durability of the motorized valve. In addition, unnecessary drive of the stator 55 of the stepping motor 50 can be suppressed.

In addition, in the above exemplary embodiment, when the valve body 25 closes the valve port 22a, the stopper 37 of the valve body holder 32 impinges to the stopper 27 of the guide bush 26, and the rotation of the rotor 57 stops at the closing valve position of the valve port 22a by the rotation stopping mechanism. However, the motorized valve may have a constitution in which a slight leakage of a fluid is allowed at a time of closing the valve. Further, the rotation stop mechanism to stop the rotation of the rotor 57 can be set at an arbitrarily position, for example, a fully opened position of the valve body 25 (the end position of the rotor 57) and the desired rotation position of the rotor 57 can be detected.

Further, in the above exemplary embodiment, the detection rotor 47 is placed on the support portion 56a formed in the rotation axis 56 of the rotor 57 and disposed relatively rotatably to the rotation axis 56 of the rotor 57. However, the motorized valve may have a constitution in which, for example, the detection rotor 47 and the rotation axis 56 are integrated and the rotation axis 56 is loosely fitted to the upper reduced diameter portion 25b of the valve body 25. The detection rotor 47 and the rotation axis 56 are integrated and relatively rotatably with respect to the rotor 57, the support ring 36, and valve body holder 32.

Figure 6:
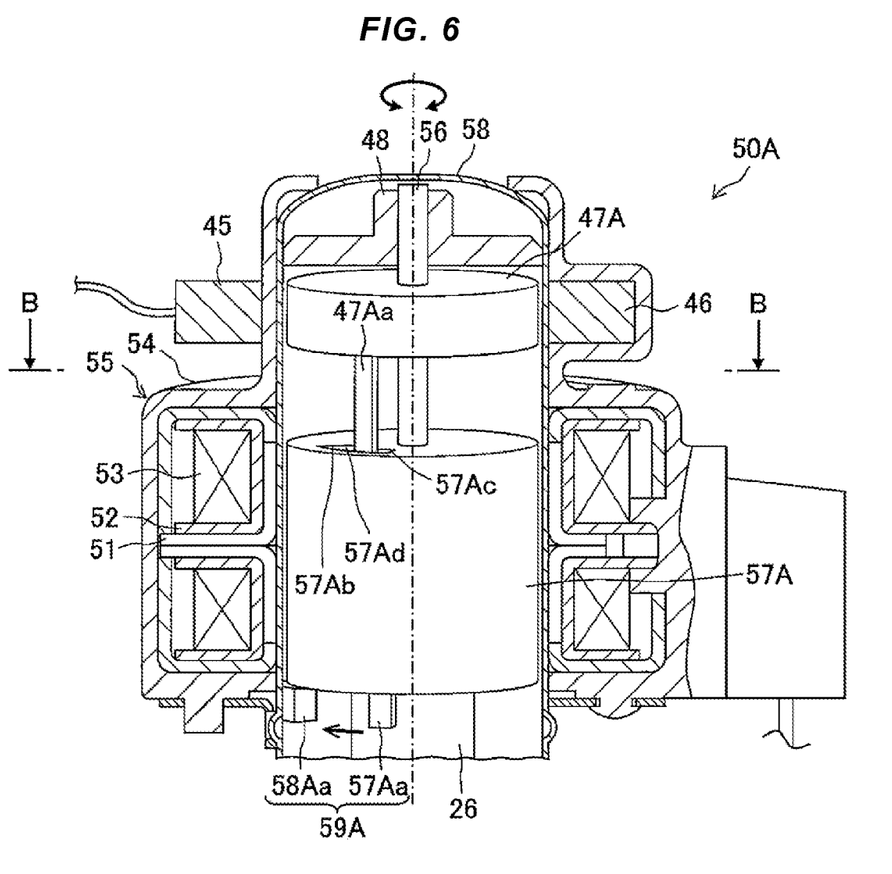
FIG. 6 is a schematic view schematically illustrating another exemplary embodiment of the stepping motor adapted to the motorized valve illustrated in FIG. 1.
Figure 7:
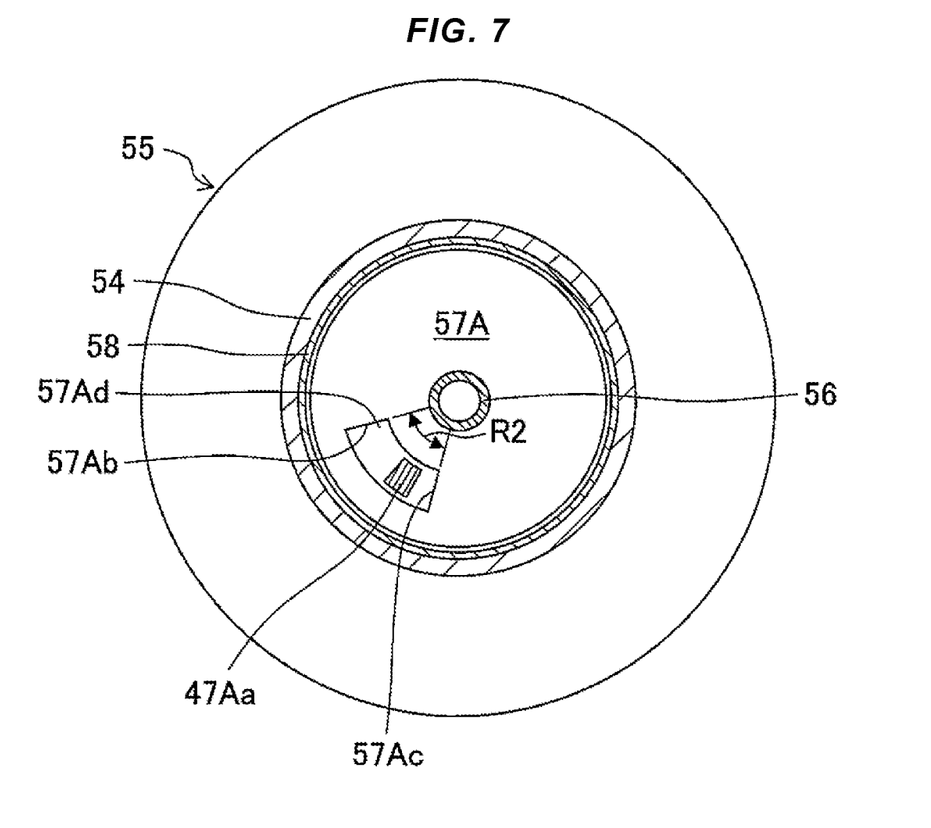
FIG. 7 is a cross-sectional view along a line B-B illustrated in FIG. 6.

FIG. 6 is a view schematically illustrating a basic constitution of another exemplary embodiment of a stepping motor applied in the motorized valve in FIG. 1. FIG. 7 is a cross-sectional view along a line B-B illustrated in FIG. 6.

The stepping motor 50A in the exemplary embodiment illustrated in FIG. 6 and FIG. 7 have different constitutions of the rotation drive mechanism and the rotation stop mechanism with respect to the stepping motor 50 illustrated in FIG. 2 and FIG. 3. The other constitutions are almost the same as the stepping motor illustrated in FIG. 2 and FIG. 3. Therefore, the same codes are attached to the same constitutions of the stepping motor 50 illustrated in FIG. 2 and FIG. 3 and the detailed explanations are omitted.

On the upper surface of the rotor 57A illustrated in FIG. 6, a concave portion (drive play concave portion) 57Ad having a predetermined length interval (or angle interval) in the rotation direction of the rotor 57A is formed. On the lower surface of a detection rotor 47A disposed on the upper side of the rotor 57A, a rod-shaped projection 47Aa, in which a top end of the projection 47Aa is loosely fitted in the concave portion 57Ad of the rotor 57A, is provided. The concave portion 57Ad is formed inside of an outer edge of the upper surface of the rotor 57A. Since the top end of the rod-shaped projection 47Aa is loosely fitted in the concave portion 57Ad like this constitution, the detection rotor 57A is relatively rotatable to the rotor 57A in the predetermined length (or angle) in the rotation direction of the rotor 57A. The predetermined length (or angle) is the length interval (or angle interval) R2 between the side surface 57Ac and the side surface 57Ac of the concave portion 57Ad of the rotor 57A. In the inside of R2 (i.e., within the range R2), the detection rotor 47A is relatively rotatable with respect to the rotor 57A (refer to FIG. 7). Similar to the above interval R1, the interval R2 is set so as to have a length (or angle), in which the rod-shaped projection 47Aa can rotate equal to or greater than the reversion length (or reversion angle) of the rotor 57A.

In a state that the rod-shaped projection 47Aa of the detection rotor 47A contacts the side surface 57Ac of the concave portion 57Ad of the rotor 57A, when the rotor 57A rotationally drives in one direction (for example, in FIG. 6, the clockwise direction viewing from the upper side), the drive force is transmitted from the rotor 57A to the detection rotor 47A. The detection rotor 47A follows the rotor 57A and forcibly rotates in the above one direction. On the other hand, in a state that the rod-shaped projection 47Aa of the detection rotor 47A contacts the side surface 57Ab of the concave portion 57Ad of the rotor 57A, the rotor 57A rotationally drives in another direction (for example, in FIG. 6, the anti-clockwise direction viewing from the upper side), the detection rotor 47A follows the rotor 57A and forcibly rotates in the above another direction.

Further, a stopper 58Aa is fixed on the lower side of the rotor 57A of the can 58. A stopper 57Aa is provided on a lower surface of the rotor 47A. When the rotor 57A rotates only a predetermined rotation number of times in the one direction, the stopper 57Aa contacts the stopper 58Aa to stop the rotation of the rotor 57A. That is, in the exemplary embodiment in FIG. 6 and FIG. 7, a rotation stop mechanism 59A stopping the rotation of the rotor 57A is constituted by the stopper 57Aa provided on the rotor 57A and the stopper 58Aa provided inside the can 58.

In this way, in the exemplary embodiment illustrated in FIG. 6 and FIG. 7, a rotation drive mechanism transmitting the rotation drive force from the rotor 57A to the detection rotor 47A is constituted by the concave portion 57Ad provided on the upper surface of the rotor 57A and the rod-shaped projection 47Aa provided on the lower surface of the detection rotor 47A. The rotation drive mechanism has a drive play having a predetermined length or angle in the rotation direction of the rotor 57A. For example, the drive play has a length or angle equal to or greater than a reversion length or reversion angle. Having this constitution, when the rotor 57A reverses, the transmission of the rotation drive force from the rotor 57A to the detection rotor 47A is inhibited only by the length or angle of the drive play. Thus, even when the drive current to the stator 55 is continued to supply after the rotor 57A is forcibly stopped by the rotation stop mechanism 59A, the rotor 57A only vibrates and the detection rotor 47A continues to stop. In this state, the magnetic material 45 detects precisely that the rotor 57A contacts the stopper and the positioning of the base point of the rotor 57A can be precisely performed. Thus, it is possible to suppress, for example, the generation of the continuous noise and vibration of the motorized valve, and lowering of the durability of the motorized valve. Further, it is possible to suppress unnecessary drive of the stator of the stepping motor.

In addition, in the above exemplary embodiments, the embodiment that two projections 57b and 57c disposed, having an interval in the rotation direction, are provided on the rotor 57, and the projection 47a disposed between the projections 57b and 57c of the rotor 57 is provided on the detection rotor 47, is described. Further, the embodiment that the concave portion 57Ad is provided on the rotor 57A, and the projection 47Aa loosely fitted in the concave portion 57Ad on the rotor 57A is provided on the detection rotor 47A. The concave portion 57Ad has a predetermined length interval (or angle interval) in the rotation direction of the rotor 57A. However, some other modified constitutions can be performed. For example, a constitution that a plurality of projections disposed, having intervals in the rotation direction, are provided on the detection rotor 47 and projections disposed between a plurality of projections of the detection rotor 47 are provided on the rotor 57, can be performed. Further, a constitution that a concave portion having a predetermined length interval (or an angle interval) in the rotation direction is provided on the detection rotor 47A and a projection loosely fitted in the concave portion of the detection rotor 47A is provided on the rotor 57, can be performed. It is possible to arbitrarily change the position and the shape of the projection or the concave portion of the rotor.

Further, in the above exemplary embodiments, when the rotor 57 or 57A reversely rotates, for inhibiting the detection rotor 47 or 47A to rotate together with the rotor 57 or 57A, the interval R1 or R2 is made to have a length (or angle) equal to or greater than the reversion length (or the reversion angle) of the rotor. The interval R1 is between the projections 57c and 57b on the rotor 57. The interval R2 is between the side surfaces 57Ab and 57Ac in the concave portion 57Ad on the rotor 57A. However, even when R1 or R2 is made to have a length (or angle) smaller than the reversion length (or the reversion angle) of the rotor, there is a range in which the detection rotor 47 or 47A does not rotate to follow the rotor 57 or 57A (i.e., there is a drive play). Thus, in this case, it can be detected that the drive waveform is clearly different from a conventional drive waveform, so that the positioning of the base point of the rotors 57 and 57A can perform precisely.

Further, in the above exemplary embodiment, the rotation stop mechanism for stopping the rotation of the rotor is constituted by the stopper 37 provided in the valve body holder 32 and the stopper 27 provided in the guide bush 26, or the stopper 57Ac provided in the rotor 57A and the stopper 58Aa provided in the can 58. However, if the rotation of the rotor disposed inside the stator can be stopped, the constitution of the rotation stop mechanism can be changed arbitrarily.

Further, in the above embodiment, the rotation of the rotor is inhibited by the magnetic field formed in the periphery of the rotor by the magnetic material 46. However, the rotation of the rotor can be inhibited by an appropriate urging force, for example, frictional resistance, or the like.

Furthermore, in the above exemplary embodiment, the stepping motor according to the present invention is applied in the motorized valve and the embodiment, in which the base point positioning of the rotor is performed when the valve body reaches a predetermined position, is described. However, the stepping motor according to the present invention is applicable to other equipment other than the motorized valve, which is necessary to detect the predetermined rotation position of a rotor.

EXPLANATION OF NUMERALS

1: Motorized valve
20: Valve main body
21: Valve chamber
22a: Valve port
24: Valve body portion
25: Valve body
26: Guide bush
27: Stopper
32: Valve body holder
37: Stopper
45: Hall IC
46: Magnetic material
47: Detection rotor
47a: Rod-shaped projection
50: Stepping motor
55: Stator
56: Rotation axis
57: Rotor
57Aa: Rotor side stopper
57b, 57c: projection
57Ad: Concave portion (drive play concave portion)

57Aa: Can side stopper
59: Rotation stop mechanism
L: Rotation axial center

What is claimed is:

1. A stepping motor motorized valve comprising;
a valve main body having a valve chamber and a valve port opening to the valve chamber,
a valve body disposed movably up and down in the valve chamber for opening and closing the valve port, said valve body being driven by a stepping motor,
the stepping motor comprising a stator and a rotor rotationally driven by the stator, the valve body being attached to the rotor,
a detection rotor attached to the rotor for detecting a rotation position of the rotor,
wherein the detection rotor is rotatably disposed on a co-axial center with the rotor, and rotationally driven by the rotor via a rotation drive mechanism provided between the rotor and the detection rotor, and
wherein the rotation drive mechanism has a drive play angle in a rotation direction of the rotor to such an extent as to allow the detection rotor to be moved in a direction opposite to the rotation direction of the rotor, when the detection rotor is rotated by the rotor;
a conversion mechanism for converting rotational movement of the rotor of the stepping motor to the up and down movement of the valve body, and
a rotation stop mechanism for stopping the rotation of the rotor in one direction, when the rotor is rotated by the stator in said one direction and the valve body is moved up and down by the conversion mechanism to reach a predetermined position,
wherein said angle of the drive play is defined to be equal to or greater than an angle to which the rotor is attracted in a direction opposite to said one direction due to change in magnetic pole of the stator by a subsequent drive pulse signal, when rotation of the rotor in said one direction is stopped by the rotation stop mechanism.

2. The motorized valve according to claim 1,
wherein a can is fixed to the valve main body, and wherein the rotor and the detection rotor is provided in the can.

3. The motorized valve of claim 1,
wherein the rotation drive mechanism comprises a plurality of projections provided on the rotor having a predetermined angle interval in the rotation direction, and another projection provided on the detection rotor between the plurality of projections of the rotor,
wherein said drive play is constituted by said detection rotor being relatively slidable with respect to the rotor inside the predetermined angle interval in the rotation direction.

4. The motorized valve of claim 1,
wherein the rotation drive mechanism comprises a drive play concave portion provided on the rotor having a predetermined angle interval in the rotation direction, and a projection provided on the detection rotor, and having a top end disposed in the drive play concave portion of the rotor,
wherein said drive play is constituted by said detection rotor being relatively slidable with respect to the rotor inside the predetermined angle interval in the rotation direction.

5. The motorized valve of claim 1,
wherein urging force inhibiting the rotation of the detection rotor is applied in the detection rotor.

6. The motorized valve of claim 5,
wherein the urging force is generated by a magnetic material provided outside the detection rotor.

7. The motorized valve according to claim 1,
wherein the predetermined position is a position in which the valve body closes the valve port or a position in which the valve body fully opens the valve port.

* * * * *